United States Patent

[11] 3,582,134

[72] Inventor  Howard Shaff
  Los ANGELES, Calif.
[21] Appl. No. 782,934
[22] Filed  Dec. 11, 1968
[45] Patented  June 1, 1971
[73] Assignee  California Form Products, Inc.
  Culver, Calif.

[54] AUTOMOBILE IMPACT PROTECTOR
  3 Claims, 6 Drawing Figs.
[52] U.S. Cl. .................................... 296/146,
  293/62
[51] Int. Cl. .................................... B60r 27/02
[50] Field of Search .................................... 296/146;
  293/1, 62, 54 D, 56 M

[56]  References Cited
  UNITED STATES PATENTS

| | | | |
|---|---|---|---|
| 2,889,165 | 6/1959 | Zientara | 293/54D |
| 2,986,419 | 5/1961 | Barenyi | 293/62 |
| 3,147,176 | 9/1964 | Haslam | 293/56M |

*Primary Examiner*—Philip Goodman
*Attorney*—Spensley, Horn & Lubitz

ABSTRACT: Impact protection device comprising a strip of resilient material to which magnets are coupled for securing the strip to the door or side panel of an automobile. A stiffening wire is inserted into and along the length of the body of the strip to give rigidity to the plastic strip. For door mounting, the wire extends beyond one end of the strip, and on that end is a clamping hook for fastening the strip to the door panel.

PATENTED JUN 1 1971    3,582,134
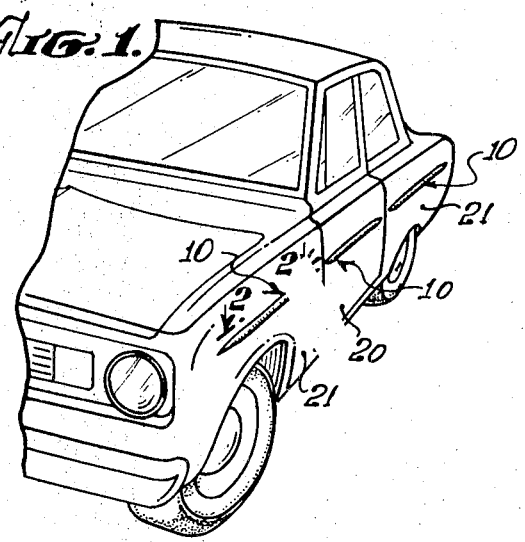
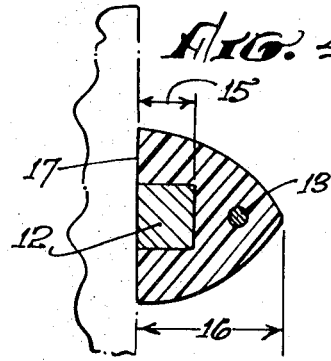
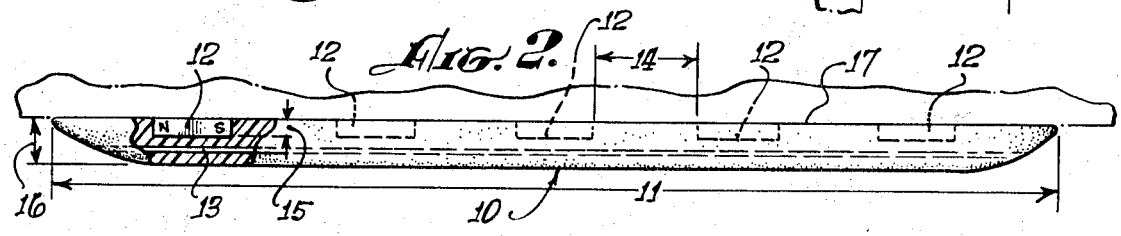
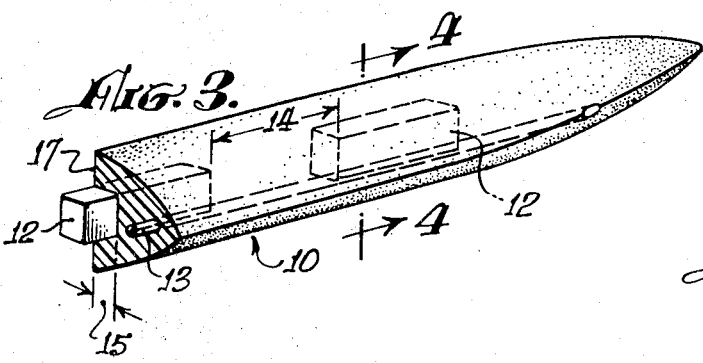
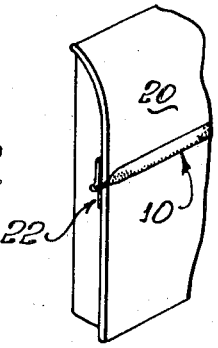
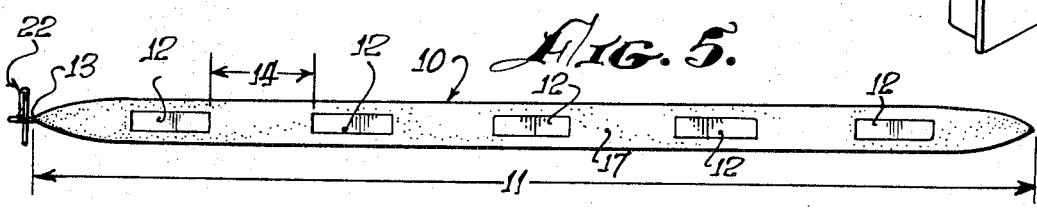
INVENTOR.
HOWARD SHAFF,
By His Attorneys.
Spensley & Horn

AUTOMOBILE IMPACT PROTECTOR

BACKGROUND OF THE INVENTION

In recent years many automobile manufacturers have discontinued the installation of protective metal strips on the doors and side panels of automobiles. The absence of protective devices generally leads to damage of the paint and metal of the unprotected areas as a result of impact from the doors of adjacent vehicles. To avert this damage, automobile owners have had to install protective strips at considerable expense.

SUMMARY

It is an object of the invention to provide a simple protective structure which will prevent impact damage to the doors and side panels of an automobile, and do so at little expense. To this end a plastic impact protector is provided. The protective structure is a tapered strip of flexible plastic into which a plurality of permanent magnets are embedded and a metal wire is inserted. The length of the protective strip will be determined by the length of the surface sought to be protected. The magnets allow the protective strip to be readily and easily mounted to the side of an automobile body without the need of a mechanic. The magnets are spaced at intervals along the length of the protective strip, the number being sufficient to securely hold the strip to the side of the automobile. The wire inserted into the protective strip provides rigidity to the structure thereby facilitating installation of the protective strip. The protective strip that is to be mounted on the door panel has a wire which is adapted for protecting the strip against theft. The inserted wire extends beyond one end of the protective strip. The extended wire can be formed into a clamping hook for physical attachment to the automobile door. When the clamping hook is in place, the strip cannot be removed without opening the door of the automobile. As an alternative, a separate clamping hook can be joined to the protruding end of the wire.

When the protective strip is mounted, the doors of adjacent automobiles will be unable to make contact with the paint or metal of the protected automobile, the impact being absorbed by the protective strip. The protective impact device provides the advantages of a metal strip at a low cost.

DESCRIPTION OF THE DRAWINGS

The novel features which are believed to be characteristic of the invention, both as to its organization and method of operation, together with further objects and advantages thereof, will be better understood from the following description considered in connection with the accompanying drawings. A presently preferred embodiment of the invention is illustrated by way of examples.

FIG. 1 is a perspective view of a portion of an automobile showing the impact protective structure mounted on the automobile door and side panels;

FIG. 2 is an enlarged view of the mounted impact portion device of the present invention in partial cross section;

FIG. 3 is a perspective view of the impact protection device partially in cross section;

FIG. 4 is an enlarged cross-sectional view of the protective device of the present invention;

FIG. 5 is a bottom view of the coupling surface of the present invention impact protection device; and, FIG. 6 is a perspective view of an automobile door showing the protective device mounted to the door panel and received by the clamping hook.

DESCRIPTION OF THE PRESENTLY PREFERRED EMBODIMENTS

Referring to FIG. 2, the protective structure includes a plastic strip 10 having a predetermined length 11. The strip 10 may be constructed from any of the well-known resilient materials such as plastics employed for impact protection, e.g., polyvinyl. FIG. 1 illustrates the protective strip 10 mounted on an automobile door 20 and side panels 21. The length 11 of the protective strip 10 is determined by the size of the automobile door 20 and side panels 21 sought to be protected. It is important that the protective strip 10 fully cover the surface sought to be protected in order to prevent impact from the doors of adjacent vehicles.

Since the plastic used for the protective strip 10 is in itself flexible, a metal wire 13 is inserted into the protective strip 10 to provide rigidity to the structure. The rigidity supplied by the metal wire 13 facilitates mounting the impact protection strip 10 as well as aiding alignment of the strip 10 on the automobile door 20 and side panels 21. Referring to FIG. 4, the position of the metal wire 13 in the protective strip 10 need only be spacially consistent with the depth 16 of the protective strip 10 and the depth 15 of the embedded magnets 12. The protective strip 10 that is to be mounted on the side panels 21 differs from the protective strip 10 that is to be mounted on the door panel 20 in that the latter has a clamping hook 22 to clamp the protective strip 10 to the door panel 20. In FIG. 6, the protective strip 10 is shown clamped to the door panel 20 by the clamping hook 22. Referring to FIG. 5, the clamping hook 22 is formed by extending the metal wire 13 beyond one end of the protective strip 10. The protruding end of metal wire 13 is formed into the clamping hook 22 which will clamp the door panel 20 between the body of metal wire 13 and the perpendicular portion of the shaped wire.

To secure the impact protection strip 10 to the automobile door 20 and side panels 21, a plurality of permanent magnets 12 are inserted in the strip 10. The magnets are spaced at intervals 14 along the strip 10. The number of magnets 12 used are such as to be consistent with the force required to support the weight of the protective strip 10 and to securely attach the strip 10 to the automobile door 20 and side panels 21. The spacial interval 14 between the magnets 12 is determined by the length 11 of the protective strip 10 and the number of magnets 12 which are required to secure the protective strip 10 to the automobile door 20 and side panels 21.

Referring to FIG. 4, the permanent magnets 12 are embedded into and held securely in the protective strip 10. The depth 15 to which the magnets 12 are embedded must be such that the magnets 12 are approximately even with the bottom surface 17 of the protective strip 10. The depth 15 must therefore be consistent with the size of the selected permanent magnets 12. By embedding the magnets at the proper depth 15, it will insure a secure coupling between the protective strip 10 and the automobile door 20 and side panels 21. The manner in which the permanent magnets 12 are secured to the protective strip 10 can be any means which will prevent the magnets 12 from disengaging themselves from the protective strip 10, e.g., a forced fit.

From the above description it can be seen that the invention provides a structure that is as fully effective as a factory-installed metal strip, but which can be installed by an automobile owner.

What I claim is:

1. An automobile impact protection device comprising:
    a. a solid strip of material capable of withstanding impact;
    b. magnetic securing means coupled to said strip at spaced intervals for securing said strip to a surface to be protected;
    c. wire means for stiffening said strip, said wire means being disposed within and extending through substantially the length of said strip, said wire means protruding beyond an end of said strip; and
    d. clamping means for coupling said device to an automobile door panel integral with the protruding end of said wire means.

2. An impact protection device comprising:
    a. a strip of flexible plastic capable of withstanding impact;
    b. magnetic securing means coupled to said strip at spaced intervals for securing said strip to an automobile or truck side panel and;

c. wire means for stiffening said strip of flexible plastic joined to said strip, said wire means protruding beyond an end of said plastic strip and having clamping means for securing said device to an automobile door panel being integral with and extending from said protruding end of said wire means.

3. An impact protection device comprising:
a. a strip of flexible polyvinyl capable of withstanding impact;
b. a plurality of permanent magnets inserted within said strip at spaced intervals whereby said strip is adapted to be secured to an automobile or truck side panel and;
c. a wire inserted within and along the length of said polyvinyl strip, said wire protruding beyond an end of said strip and being formed into a clamping hook adapted to clamp said device to an automobile or truck door panel.